US008522280B2

(12) United States Patent
Tokashiki et al.

(10) Patent No.: US 8,522,280 B2
(45) Date of Patent: Aug. 27, 2013

(54) DISPLAY CONTROL APPARATUS, DISPLAY CONTROL METHOD AND COMMUNICATION SYSTEM

(75) Inventors: Mamoru Tokashiki, Tokyo (JP); Fujio Nobori, Kanagawa (JP)

(73) Assignee: Sony Corporation, Tokyo (JP)

( * ) Notice: Subject to any disclaimer, the term of this patent is extended or adjusted under 35 U.S.C. 154(b) by 747 days.

(21) Appl. No.: 12/549,715

(22) Filed: Aug. 28, 2009

(65) Prior Publication Data

US 2010/0058389 A1 Mar. 4, 2010

(30) Foreign Application Priority Data

Sep. 3, 2008 (JP) ................................ P2008-226343

(51) Int. Cl.
*G06F 3/00* (2006.01)

(52) U.S. Cl.
USPC .................. 725/47; 725/39; 725/40; 725/44; 725/45; 725/46

(58) Field of Classification Search
None
See application file for complete search history.

(56) References Cited

U.S. PATENT DOCUMENTS

| | | | |
|---|---|---|---|
| 6,694,514 B1 * | 2/2004 | Dobbelaar et al. | 725/47 |
| 2002/0052864 A1 * | 5/2002 | Yamamoto | 707/1 |
| 2006/0271951 A1 * | 11/2006 | Ishizaki | 725/32 |

FOREIGN PATENT DOCUMENTS

| | | |
|---|---|---|
| JP | 2006-313948 | 11/2006 |
| JP | 2007-123980 | 5/2007 |
| JP | 2009-017220 | 1/2009 |
| JP | 2006-094401 | 4/2009 |

* cited by examiner

*Primary Examiner* — Cai Chen
(74) *Attorney, Agent, or Firm* — Finnegan, Henderson, Farabow, Garrett & Dunner, LLP

(57) ABSTRACT

A client device includes a display control unit for setting a current time line indicating a current time on the display screen to divide the display screen into a fixed region and a moving region across the current time line as boundary, for moving a program object set in the moving region toward the current time line at a predetermined speed to set, among program information contained in the EPG data obtained by the EPG data obtaining unit, a program object describing therein program identification information contained in the program information on certain program information whose program start time is earlier than a current time, which is contained in the program information, at a position reaching the current time line in the moving region when the program start time comes, and for, when the program object reaches the current time line, shifting the program object to the fixed region.

5 Claims, 14 Drawing Sheets

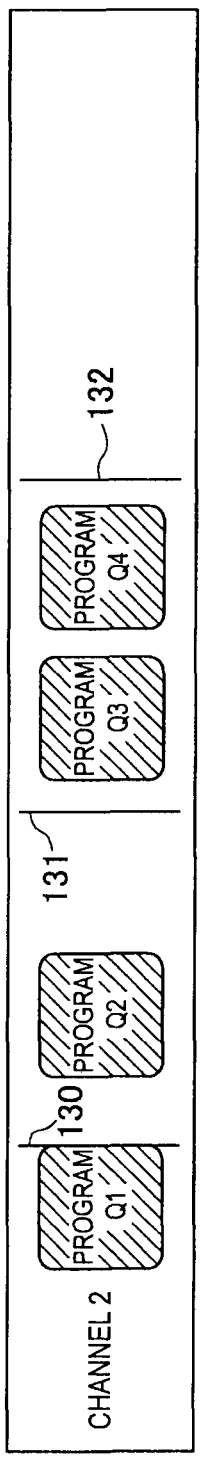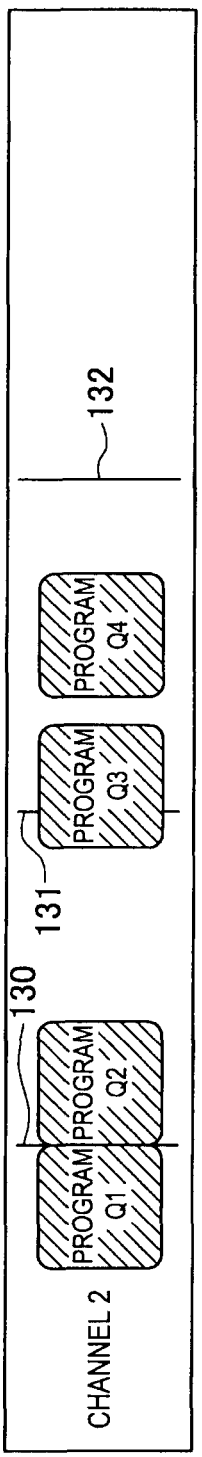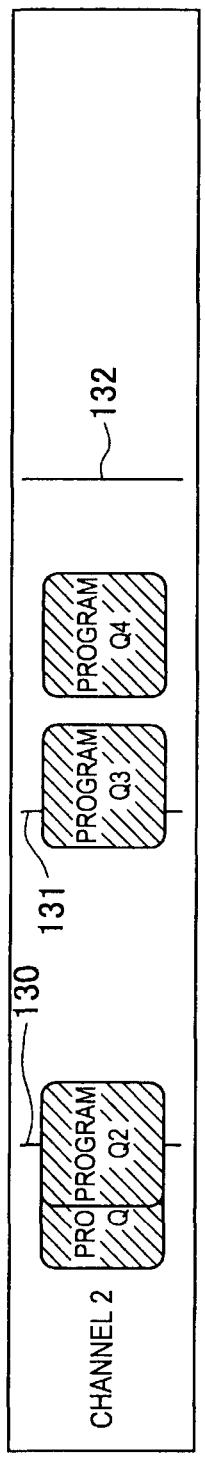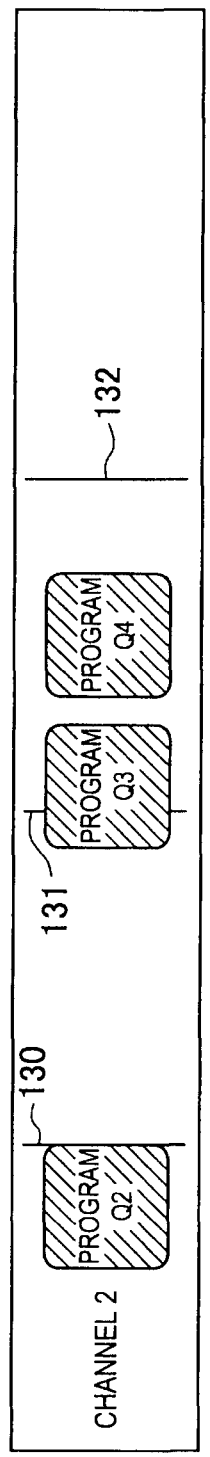
FIG.8A
FIG.8B
FIG.8C
FIG.8D

FIG.10A  
FIG.10B  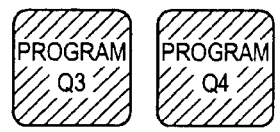
FIG.10C  

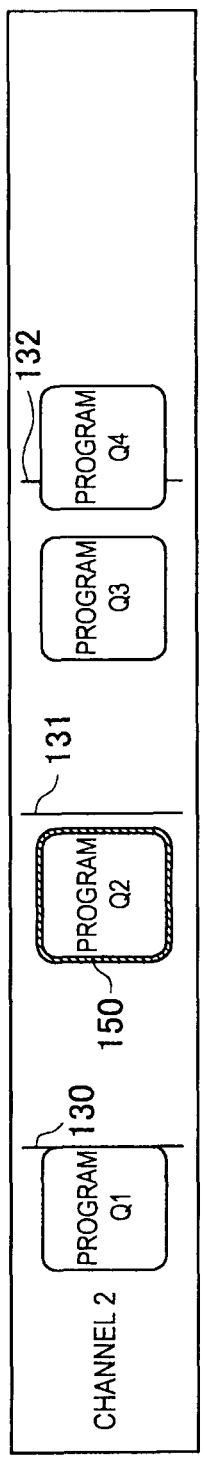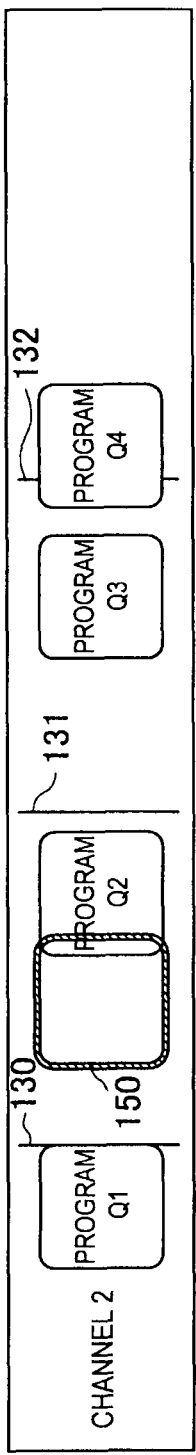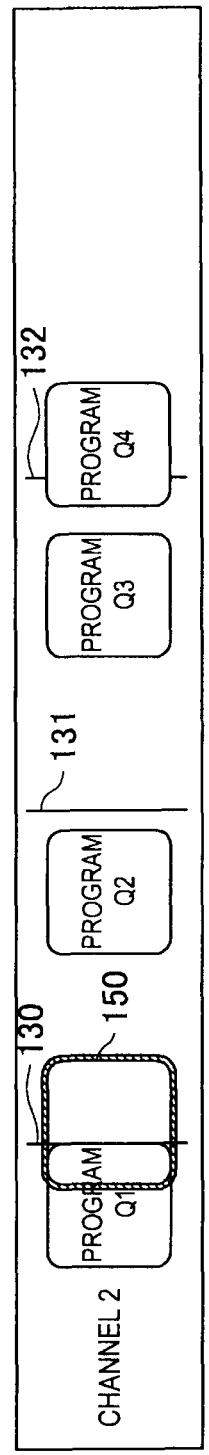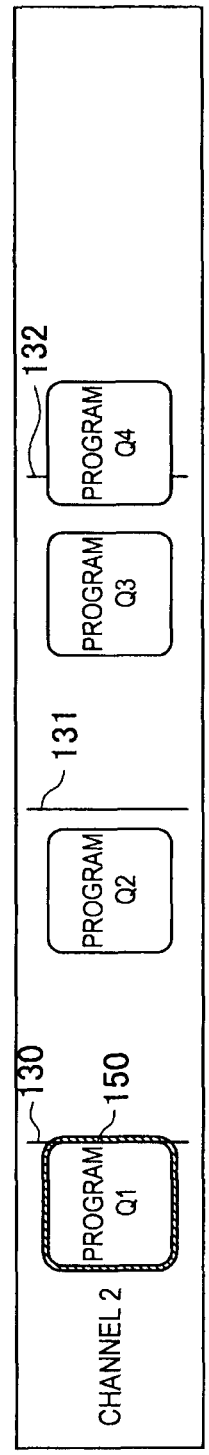

DISPLAY CONTROL APPARATUS, DISPLAY CONTROL METHOD AND COMMUNICATION SYSTEM

FIELD OF THE INVENTION

The present invention relates to a display control apparatus, display control method and communication system.

DESCRIPTION OF THE RELATED ART

In related art, there has been known an EPG (Electronic Program Guide) as a system for displaying a program guide on a screen of a display control apparatus. Various techniques for displaying a program guide have been disclosed.

For example, there has been disclosed a technique for setting a time axis in the horizontal direction of a display screen and setting a program column on the time axis assuming the left side of a rectangle as the broadcast start time and a right side of the rectangle as the broadcast end time (for example, see Japanese Patent Application Laid-Open No. 2006-313948). A user can easily grasp a length of a broadcast time of each program by viewing the program column.

SUMMARY OF THE INVENTION

However, according to the technique disclosed in Japanese Patent Application Laid-Open No. 2006-313948 described above, there was an issue that it takes time to grasp which program is being currently broadcasted. Further, there was an issue that it takes time to grasp which program will be broadcasted next. Particularly, there was an issue that as the number of channels increases, it takes time to grasp which program is being currently broadcasted and which program will be broadcasted next.

The present invention has been therefore made in terms of the above issues, and it is desirable to provide a novel and improved technique capable of facilitating to grasp which program is being currently broadcasted and facilitating to grasp which program will be broadcasted next.

According to an embodiment of the present invention, there is provided a display control apparatus including: an EPG data obtaining unit for obtaining EPG data from an EPG data providing server for providing the EPG data containing one or several items of program information; a display unit for displaying a display screen; and a display control unit for setting a current time line indicating a current time on the display screen to divide the display screen into a fixed region and a moving region across the current time line as boundary, for moving a program object set in the moving region toward the current time line at a predetermined speed to set, among program information contained in the EPG data obtained by the EPG data obtaining unit, a program object describing therein program identification information contained in the program information on certain program information whose program start time is earlier than a current time, which is contained in the program information, at a position reaching the current time line in the moving region when the program start time comes, and for, when the program object reaches the current time line, shifting the program object to the fixed region.

The display control unit may set, among program information contained in the EPG data obtained by the EPG data obtaining unit, a program object describing therein program identification information contained in the program information on certain program information whose program start time is later than a current time, which is contained in the program information, in the fixed region.

The display control unit may set the sizes of the program objects of all program information contained in the EPG data to be the same.

When the program object is shifted to the fixed region, the display control unit may fade a program object reaching the current time line out the moving region and fade the program object in the fixed region.

According to the embodiments of the present invention described above, it is possible to facilitate to grasp which program is being currently broadcasted and facilitate to grasp which program will be broadcasted next.

BRIEF DESCRIPTION OF THE DRAWINGS

FIG. 8 is a diagram showing a state where both the lower layer and the higher layer configuring the display screen (on program object shift) according to the present embodiment are superimposed;

FIG. 11 is a diagram showing a state where both the lower layer and the higher layer configuring the display screen (on cursor movement) according to the present embodiment are superimposed;

DETAILED DESCRIPTION OF THE PREFERRED EMBODIMENTS

Figure 1:
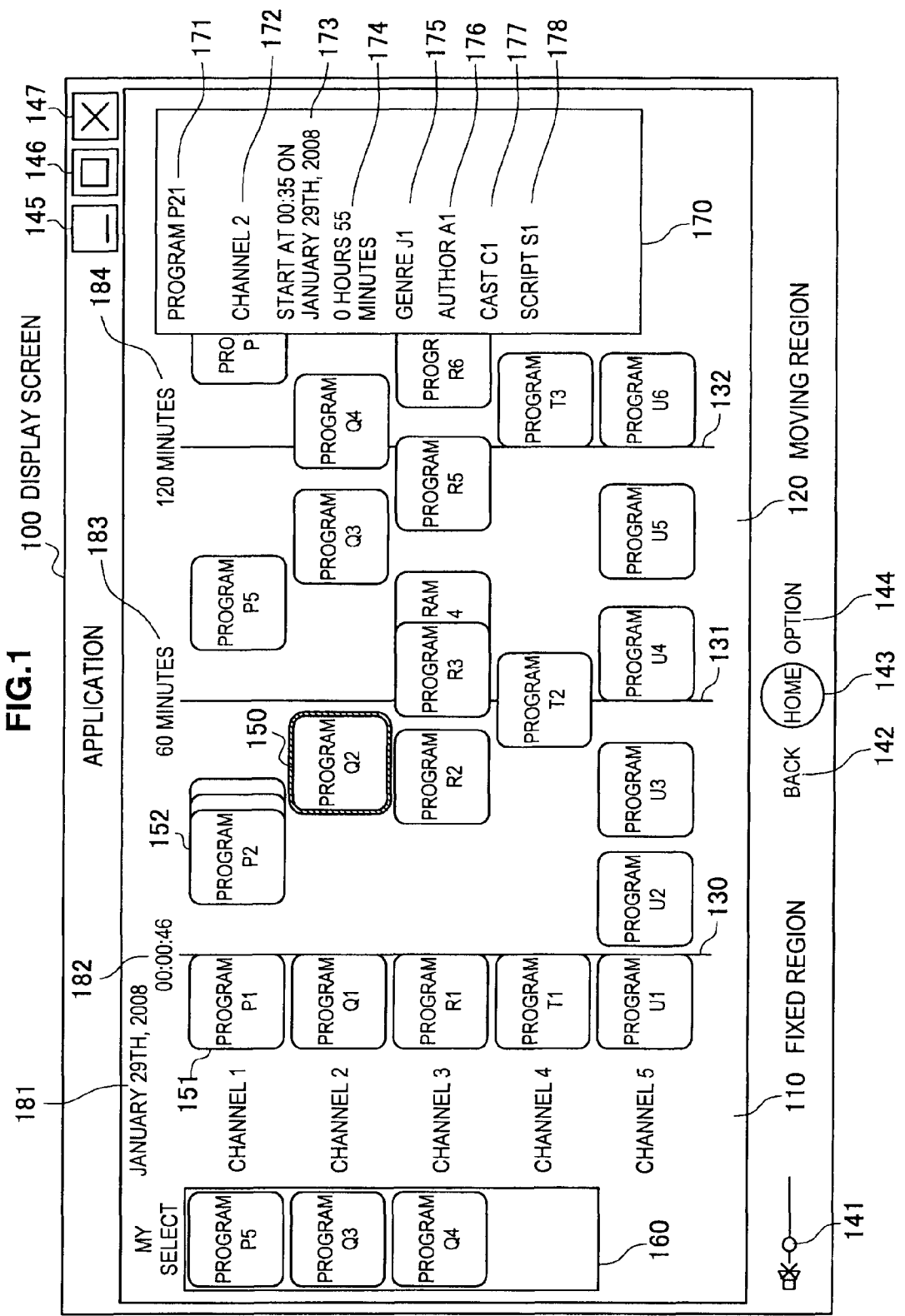
FIG. 1 is a diagram showing an example of a display screen displayed on a display unit of a display control apparatus according to an embodiment.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted. The description thereof will be made as follows.

1. Outline of the present embodiment
2. Configuration of communication system according to the present embodiment
3. Functional configuration of client device according to the present embodiment
4. Operation of client device according to the present embodiment
5. Layers configuring display screen according to the present embodiment
6. Layers configuring display screen according to the present embodiment (on program object shift)
7. Layers configuring display screen according to the present embodiment (on cursor movement)
8. Hardware configuration of client device according to the present embodiment 1. Outline of the Present Embodiment An outline of the present embodiment will be described with reference to FIG. 1. FIG. 1 is a diagram showing an example of a display screen displayed on a display unit of a display control apparatus according to the present embodiment.

When an application having a function of displaying program information is activated through a user's operation, the display control apparatus according to the present embodiment displays a display screen 100 as shown in FIG. 1, for example, as an initial screen. For the display screen 100, a current date 181 indicating a current date and a current time 182 indicating a current time are set as shown in FIG. 1. A current time line 130 is set as a line indicating a position of the current time 182 for the display screen 100. The display screen 100 is divided into a fixed region 110 and a moving region 120 across the current time line 130 as boundary.

In the fixed region 110, there are set program objects 151 describing therein program identification information (such as title of program) capable of identifying a currently-broadcasted program for each channel. For example, the program object describing therein "program P1" is indicated as program identification information at the row of the channel 1. Similarly, the program object describing therein "program Q1" is indicated as program identification information at the row of the channel 2. The program object describing therein "program R1" is indicated as program identification information at the row of the channel 3. The program object describing therein "program T1" is indicated as program identification information at the row of the channel 4. The program object describing therein "program U1" is indicated as program identification information at the row of the channel 5.

In the moving region 120, there are set program objects 152 describing therein program identification information (such as title of program) capable of identifying a program whose program start time is earlier than a current time for each channel. For example, the program objects describing therein "program P2" to "program P5" are indicated as program identification information at the row of the channel 1. Similarly, the program objects describing therein "program Q2" to "program Q4" are indicated as program identification information at the row of the channel 2. The program objects describing therein "program R2" to "program R6" are indicated as program identification information at the row of the channel 3. The program objects describing therein "program T2" to "program T3" are indicated as program identification information at the row of the channel 4. The program objects describing therein "program U2" to "program U6" are indicated as program identification information at the row of the channel 5.

The program objects 152 set in the moving region 120 are moved toward the current time line 130 at a predetermined speed. In the moving region 120, a time axis 131 is set as a line which indicates a position indicating a delay 183 relative to the current time (60 minutes in the example shown in FIG. 1). Similarly, in the moving region 120, a time axis 132 is set as a line which indicates a position indicating a delay 184 relative to the current time (120 minutes in the example shown in FIG. 1). The program object 152 is set at a position reaching the current time line 130 when the program start time comes. When the program object reaches the current time line 130, the program object 152 is shifted to the fixed region and the program object 151 is overwritten thereon.

A cursor 150 is displayed to emphasize a program object, which is displayed to surround the program object, for example. The cursor 150 is placed on the user-interested program object through a user's operation. The user's operation includes designation of vertical or horizontal direction, and the like. For example, when the user designates the upward direction, the cursor 150 is placed on the program object nearest to the current position of the cursor 150, which is at the first channel from the current position of the cursor 150 in the upward direction. In the example shown in FIG. 1, when the user designates the upward direction, the cursor 150 is moved from "program Q2" to "program P4" (positioned at the right side of "program P2" by 2). Also when the user designates the downward direction, the cursor 150 is similarly moved to the program object nearest to the current position of the cursor 150, which is at the channel below the current position of the cursor 150 by one, for example.

When the user designates the left direction, for example, the cursor 150 is moved to the program object nearest to the current position of the cursor 150, which is at the left side of the current position of the cursor 150. In the example shown in FIG. 1, when the user designates the upward direction, the cursor 150 is moved from "program Q2" to "program Q1". Similarly, for example, when the user designates the right direction, the cursor 150 is moved to the program object nearest to the current position of the cursor 150, which is at the right side of the current position of the cursor 150.

A detail window 170 is directed for displaying program information of the program object on which the cursor 150 is placed. The program information includes program identification information 171, channel 172, program start time 173, broadcast time 174, genre 175, author 176, cast 177, script 178 and the like.

A my select 160 is an area where the program objects of user-interested programs and the like can be moved from the fixed region 110 or the moving region 120 for storage. Thus, the user can use the programs of the program objects in the my select 160 for recording or can transmit the program information of the program objects in the my select 160 to other client device 20 via the network 30.

In the display screen 100, there are arranged various objects such as a return button 142 for returning to a previous screen, a home button 143 for returning to the initial screen, an option button 144 for moving to an option setting screen and a sound volume setting button 141. Further, in the display screen 100, there are arranged a minimizing button 145 for minimizing the size of the display screen 100, a maximizing button 146 for maximizing the size of the display screen 100, a closing button 147 for closing the display screen 100, and the like.

Figure 3:
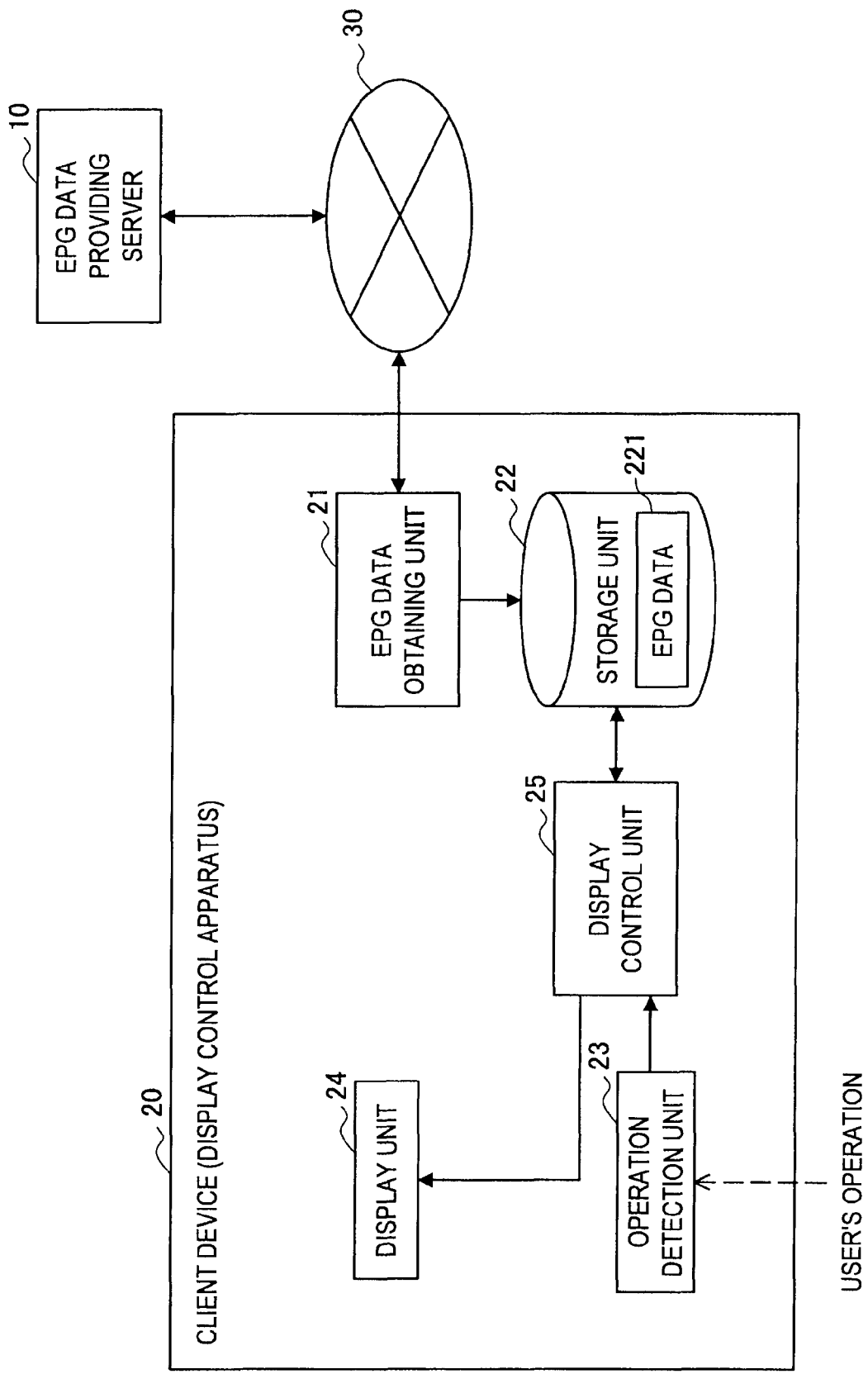
FIG. 3 is a diagram showing a functional configuration of a client device according to the present embodiment.

The application is stored in the storage unit, ROM (Read Only Memory), RAM (Random Access Memory) or the like included in the display control apparatus 20 (see FIG. 3). Then, the application is read in a CPU (Central Processing Unit) included in the display control apparatus 20 (see FIG. 3) for execution. The application may be stored in a volatile memory provided in the display control apparatus 20 (see FIG. 3) or a volatile memory connected to the display control apparatus 20 (see FIG. 3). A computer readable recording medium recording the application therein can be provided. The recording medium includes a magnetic disk, optical disk, magnetooptical disk, flash memory and the like, for example. The application may be distributed via a network, for example, without using a recording medium.

Figure 2:
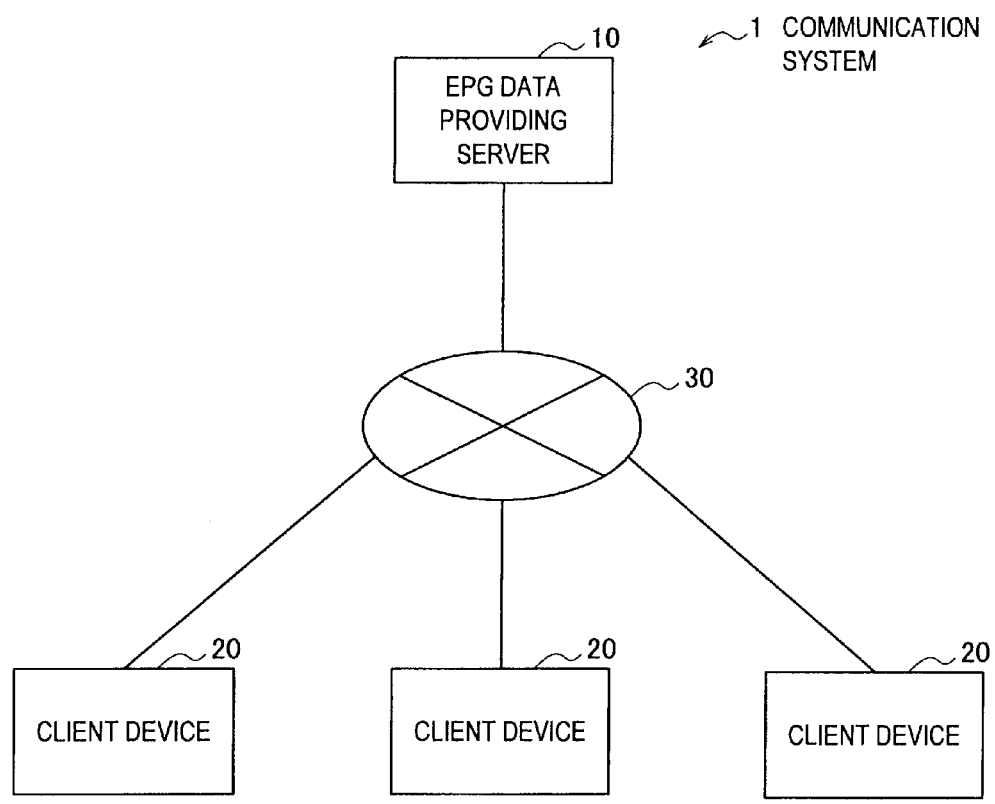
FIG. 2 is a diagram showing a configuration of a communication system according to the present embodiment.

2. Configuration of Communication System According to the Present Embodiment Subsequently, a configuration of a communication system according to the present embodiment will be described with reference to FIG. 2. FIG. 2 is a diagram showing the configuration of the communication system according to the present embodiment.

As shown in FIG. 1, in the communication system 1 according to the present embodiment, an EPG data providing server 10 and the client device 20 are communicable to each other via the network 30. In the example show in FIG. 1, three client devices 20 are illustrated but an arbitrary number of client devices 20 may be provided.

The EPG data providing server 10 is directed for providing EPG data to the client device 20 via the network 30 in response to a request from the client device 20. The client device 20 will be described later with reference to FIG. 2.

The network 30 is a communication line network for connecting the EPG data providing server 10 and the client device 20 in a bidirectionally or unidirectionally communicable manner. The network 30 is configured with, for example, a public line network such as Internet, telephone line network, satellite communication network or broadcast communication path, or a dedicated line network such as WAN (Wide Area Network), LAN (Local Area Network), IP-VPN (Internet Protocol-Virtual Private Network), Ethernet (registered trademark) or wireless LAN, irrespective of being wired or wireless.

The client device 20 is not limited to a computer device (including notebook type and desktop type) such as personal computer (PC) and may be a TV receiver, DVD/HDD recorder, Blu-ray recorder, cell phone, PDA, digital camera or the like. A device having a communication function via a network can be configured with a home information appliance such as home game player or digital video camera, a tuner or decoder for TV broadcast, or the like. The client device 20 may be a portable device which a subscriber can carry, such as portable game player, PHS or portable video/audio player.

3. Functional Configuration of Client Device According to the Present Embodiment Subsequently, a functional configuration of the client device according to the present embodiment will be described with reference to FIG. 3 (FIG. 1 as needed). FIG. 3 is a diagram showing the functional configuration of the client device according to the present embodiment.

As shown in FIG. 3, the client device 20 mainly includes an EPG data obtaining unit 21, a storage unit 22, an operation detection unit 23, a display unit 24 and a display control unit 25.

The EPG data obtaining unit 21 is configured with, for example, CPU, ROM, RAM, communication device or the like, and is directed for obtaining EPG data 221 from the EPG data providing server 10 via the network 30. The EPG data 221 contains one or several items of certain program information on a program. The program information contains, for example, program identification information 171, channel 172, program start time 173, broadcast time 174, genre 175, author 176, cast 177, script 178 and the like as described above. The EPG data obtaining unit 21 stores the obtained EPG data in the storage unit 22. The EPG data obtaining unit 21 may directly output the EPG data 221 obtained from the EPG data providing server 10 to the display control unit 25.

When the client device 20 is connected to the EPG data providing server 10 via the network 30, the EPG data obtaining unit 21 transmits an EPG data obtaining request to the EPG data providing server 10. When the EPG data is transmitted from the EPG data providing server 10 in response to the obtaining request, the EPG data obtaining unit 21 receives the EPG data and stores the received EPG data in the storage unit 22.

The storage unit 22 can be freely read and written by the EPG data obtaining unit 21, the operation detection unit 23, the display control unit 25 and the like. The storage unit 22 records therein the application described above with reference to FIG. 1, and various processings of the client device 20 may be performed based on the application.

The operation detection unit 23 is configured with, for example, CPU, ROM, RAM or the like, and is directed for detecting an operation of a position specification object such as mouse pointer or cursor. The detection of the operation of the position specification object includes detection as to the presence of the operation such as whether the position specification object is moving or is stopping, detection for specifying a current position of the position specification object, and the like. Further, the detection includes detection as to the direction or magnitude of the operation such as how much the position specification object has been moved in which direction. The operation detection unit 23 can perform the above processings by performing the operation detection of the input device such as mouse or cursor key for operating the position specification object, for example. The operation detection unit 23 transmits the operation information on the detected operation of the position specification object to the display control unit 25 and the like.

The display unit 24 is an output device included in the client device 20, and uses a display device such as CRT display device, liquid crystal display device, plasma display device or EL display device. The display screen 100 displayed on the display unit 24 is controlled by the display control unit 25.

The display control unit 25 is configured with, for example, CPU, ROM, RAM or the like, and sets the current time line 130 indicating a current time on the display screen 100 to divide the display screen 100 into the fixed region 110 and the moving region 120 across the current time line 130 as boundary. The display control unit 25 moves the program object set in the moving region 120 toward the current time line 130 at a predetermined speed.

The display control unit 25 sets, among program information contained in the EPG data obtained by the EPG data obtaining unit 21, a program object describing therein program identification information contained in the program information on certain program information whose program start time is earlier than the current time, which is contained in the program information, in the moving region 120. The set position reaches the current time line when the program start time comes. When the program object reaches the current time line 130, the display control unit 25 shifts the program object to the fixed region 110.

These functions of the display control unit 25 can avoid an overlap between the program object of the program being currently broadcasted and the program object of the program to be broadcasted next. Thus, it is possible to facilitate to grasp which program is being currently broadcasted and facilitate to grasp which program will be broadcasted next. Since the position of the program object is updated over time, the time until the program starts can be grasped at one view. Since the program starts at a timing when the program object is shifted to the fixed region 110, the timing when the program starts can be easily grasped.

It is assumed that the display control unit 25 detects, among program information contained in the EPG data obtained by the EPG data obtaining unit 21, certain program information whose program start time is later than the current time, which is contained in the program information. In this case, the display control unit 25 sets the program object describing therein the program identification information contained in the program information in the fixed region 110. Thus, the program object of the already-started program is set in the fixed region.

The display control unit 25 can set the sizes of the program objects of all the program information contained in the EPG data to be the same. Thus, the program objects can be tightly arranged in the my select 160, thereby obtaining a feeling of seamless operation. When the program objects having a variable size are used, Widget expression is difficult, while when the program objects having a fixed size are used, Widget expression is easy. Widget expression is more easily mounted than in the table form indicating the start time and the end time of a program in a display column having a variable length and can be described in a language such as JavaScript (registered trademark).

It is expected that the programs having a short broadcast time increase in the IPTV. When the program objects having a variable size are used, the display column is smaller and the viewability is worse in proportion to the time, while when the program objects having a fixed size are used, the viewability can be kept.

When the operation of the position specification object such as mouse pointer or cursor is detected, the display control unit 25 performs the display control on the position specification object in response to the detected operation.

There has been described above one example of the function of the client device 20 according to the present embodiment. Each component described above may be configured by using a general member or circuit, or may be configured in hardware specific to the function of each component. The function of each component may be entirely controlled by CPU or the like. Therefore, the configuration to be utilized can be appropriately changed depending on a technical level when the present embodiment is performed.

4. Operation of Client Device According to the Present Embodiment

Figure 4:
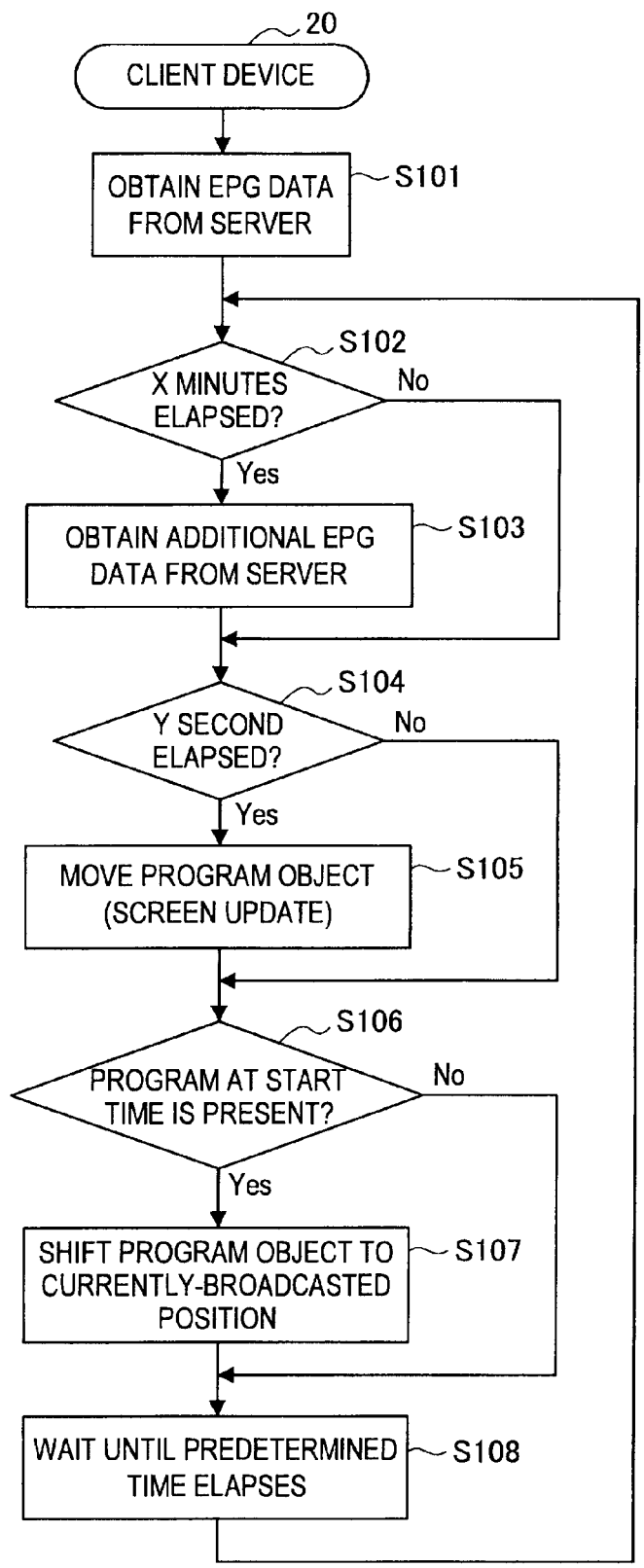
FIG. 4 is a diagram showing an operation example of the client device according to the present embodiment.

Subsequently, an operation example of the client device according to the present embodiment will be described with reference to FIG. 4 (see FIG. 1 as needed). FIG. 4 is a diagram showing the operation example of the client device according to the present embodiment.

As shown in FIG. 4, the EPG data obtaining unit 21 of the client device 20 obtains EPG data from the server (EPG data providing server 10) (step S101). The amount of EPG data to be obtained may be arbitrary, and an amount of data for six hours (for 360 minutes) is obtained, for example. The EPG data obtaining unit 21 determines whether X minutes (X=180, for example) have elapsed (step S102). When X minutes have elapsed ("Yes" in step S102), additional EPG data is obtained from the server (step S103) and the processing proceeds to step S104. Here, the amount of EPG data to be obtained may be arbitrary, and the data may be obtained for as much 180 minutes as the elapsed time, for example. When X minutes have not elapsed ("No" in step S102), the processing proceeds to step S104.

The display control unit 25 determines whether Y seconds (Y=20, for example) have elapsed (step S104). When Y seconds have elapsed ("Yes" in step S104), the program object is moved to update the display screen 100 (step S105), and the processing proceeds to step S106. When Y seconds have not elapsed ("No" in step S104), the processing proceeds to step S106.

The display control unit 25 determines whether a program at the start time is present (step S106). When it is determined that the program at the start time is present ("Yes" in step S106), the program object of the program at the start time is shifted to the currently-broadcasted position (step S107), and the processing proceeds to step S108. When it is determined that the program at the start time is not present ("No" in step S106), the processing proceeds to step S108.

The display control unit 25 waits until a predetermined time elapses (step S108) and returns to step S102. The length of the predetermined time is not particularly limited, and may be one second, for example.

5. Layers Configuring Display Screen According to the Present Embodiment

Figure 5:
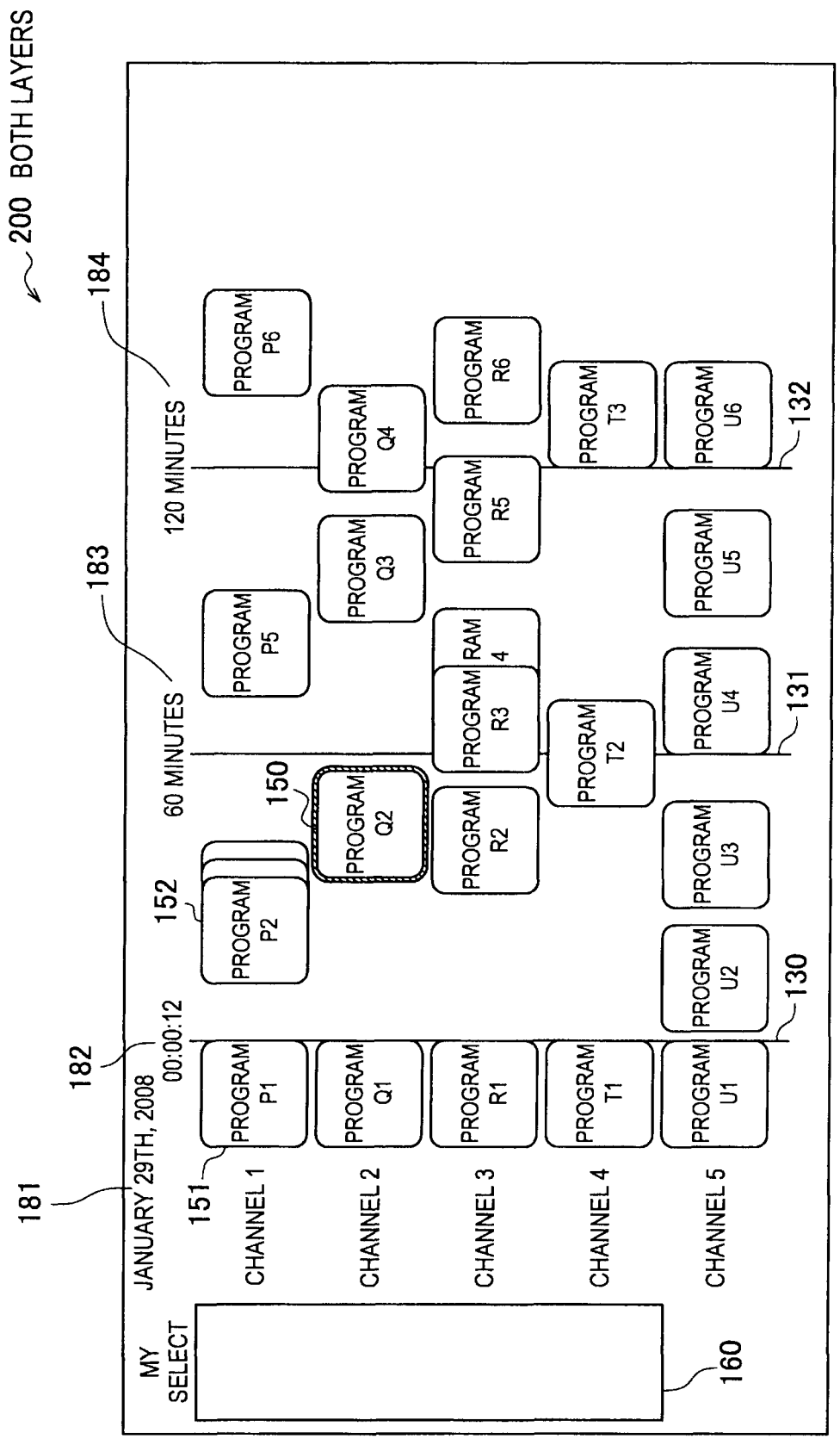
FIG. 5 is a diagram showing a state where both a lower layer and a higher layer configuring the display screen according to the present embodiment are superimposed.
Figure 6:
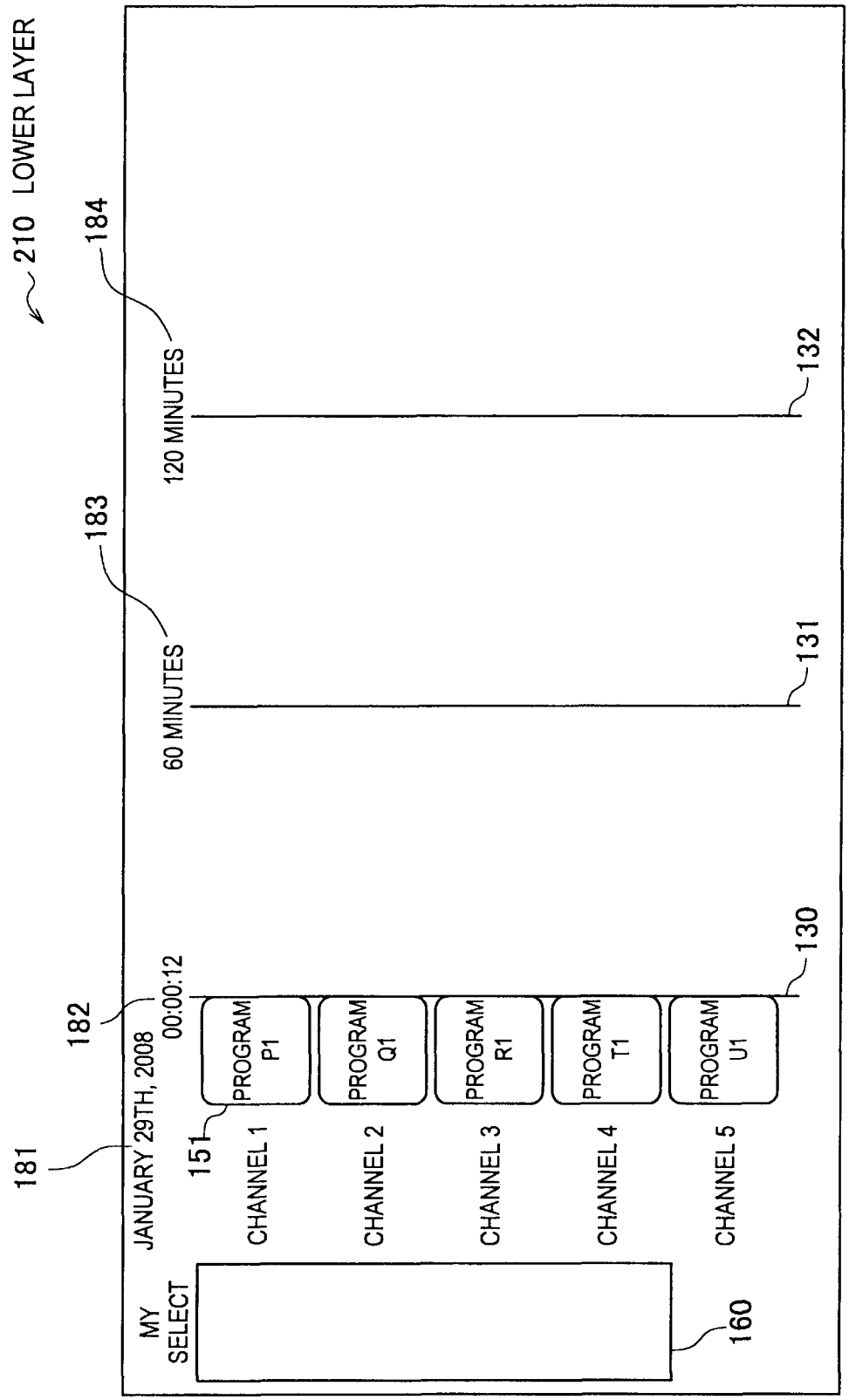
FIG. 6 is a diagram showing the lower layer configuring the display screen according to the present embodiment.
Figure 7:
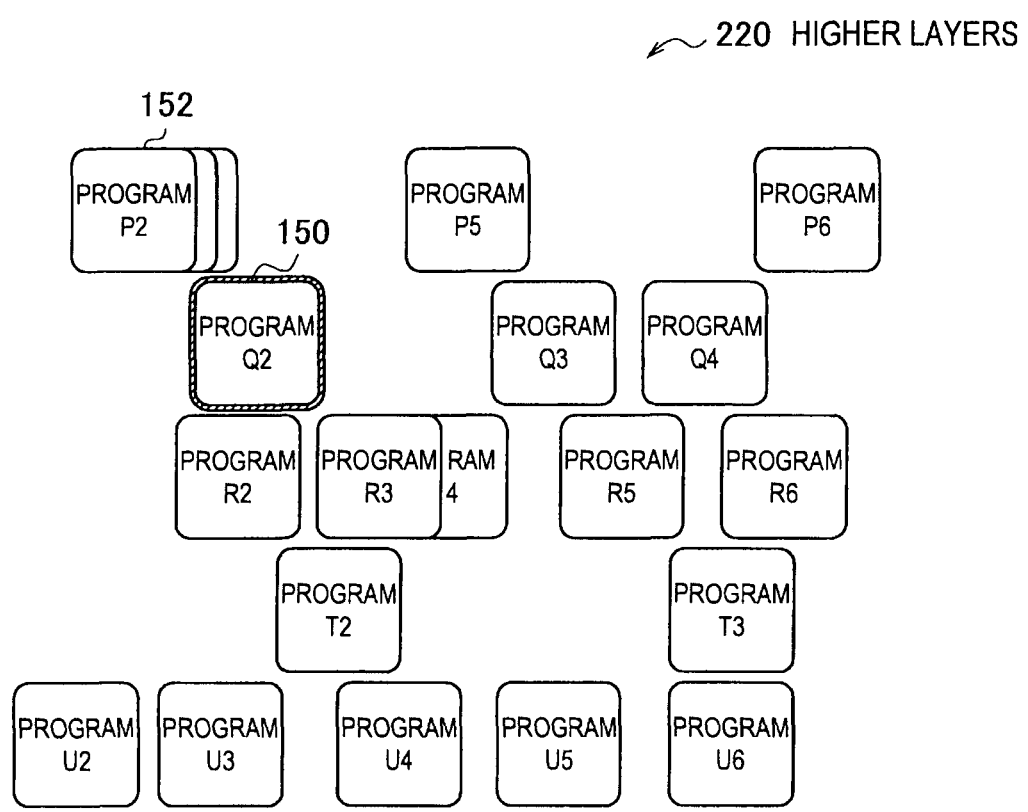
FIG. 7 is a diagram showing the higher layer configuring the display screen according to the present embodiment.

Subsequently, the layers configuring the display screen according to the present embodiment will be described with reference to FIGS. 5 to 7 (see FIG. 1 as needed). FIG. 5 is a diagram showing a state where both a lower layer and a higher layer configuring the display screen according to the present embodiment are superimposed. FIG. 6 is a diagram showing the lower layer configuring the display screen according to the present embodiment. FIG. 7 is a diagram showing the higher layer configuring the display screen according to the present embodiment.

The contents set in a lower layer 210 is fixed. The display control unit 25 moves the contents set in a higher layer 220 toward the current time line 130 (see FIG. 6) at a predetermined speed. The display control unit 25 can generate both the layers 200 as shown in FIG. 5 by superimposing the higher layer 220 as foreground as shown in FIG. 7 on the lower layer 210 as background as shown in FIG. 6, for example. The display control unit 25 can display the display screen 100 containing both the layers 200 on the display unit 24, for example.

6. Layers Configuring Display Screen According to the Present Embodiment (on Program Object Shift)

Subsequently, the layers configuring the display screen according to the present embodiment (on program object shift) will be described with reference to FIGS. 8 to 10 (see FIG. 1 as needed). FIG. 8 is a diagram showing a state where both the lower layer and the higher layer configuring the display screen (on program object shift) according to the present embodiment are superimposed. FIG. 9 is a diagram showing the lower layer configuring the display screen according to the present embodiment (on program object shift). FIG. 10 is a diagram showing the higher layer configuring the display screen according to the present embodiment (on program object shift).

FIGS. 8A to 8D illustrate the states where both the lower layer and the higher layer are superimposed, respectively. FIG. 8A shows a state where the program indicated by the program object "program Q2" has not reached the current time line 130. FIG. 8B shows a state where the program indicated by the program object "program Q2" has reached the current time line 130. FIG. 8C shows a state where the program object "program Q2" is shifting. FIG. 8D shows a state where the shift of the program object "program Q2" is completed and then the program object "program Q1" is overwritten on the program object "program Q2".

Figure 9A:
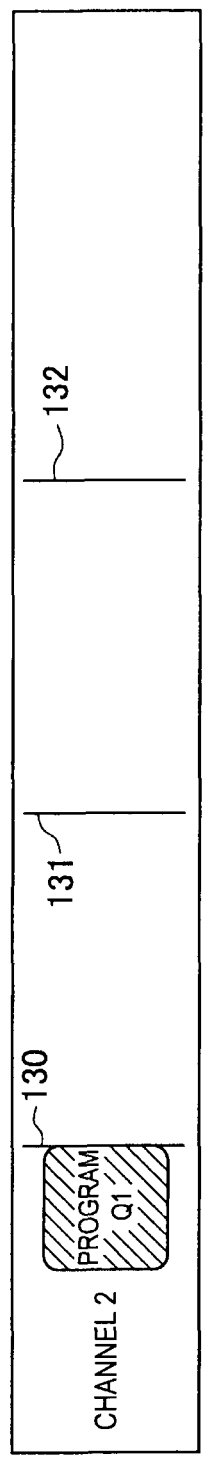
FIG. 9 is a diagram showing the lower layer configuring the display screen (on program object shift) according to the present embodiment.
Figure 9B:
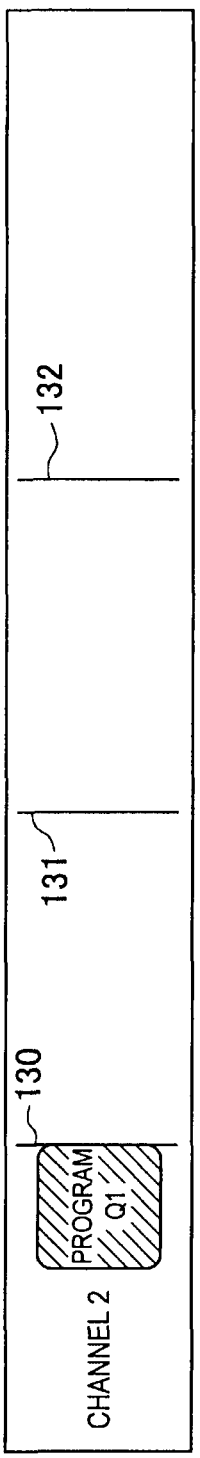
Figure 9C:
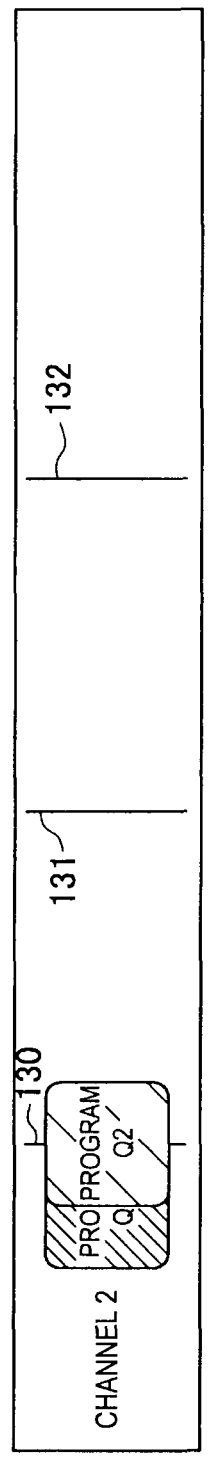
Figure 9D:
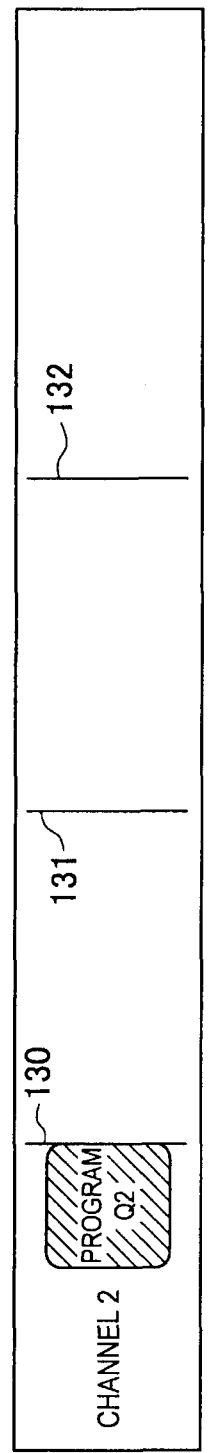

FIGS. 9A to 9D show the lower layer, respectively. FIG. 9A shows the lower layer at the time in the state of FIG. 8A. In this figure, the program object "program Q2" is not illustrated. FIG. 9B shows the lower layer at the time in the state of FIG. 8B. Also in this figure, the program object "program Q2" is not illustrated. FIG. 9C shows the lower layer at the time in the state of FIG. 8C. In this figure, the program object "program Q2" is illustrated. The hatching of the program object "program Q2" in FIG. 9C is shown to be coarser than the hatching of other program object, and as the transmittance of the program object "program Q2" is lowered, the hatching is shown to be coarser. FIG. 9D shows the lower layer at the time in the state of FIG. 8D. Also in this figure, the program object "program Q2" is illustrated. The hatching of the program object "program Q2" in FIG. 9D is shown to be as coarse as the hatching of other program objects.

In this manner, when the program object is shifted, the program object to be shifted is set in the lower layer. In this case, the transmittance of the program object to be shifted is increased in a stepwise manner from the shift start until the shift completion so that the program object to be shifted is preferably faded in.

Figure 10D:
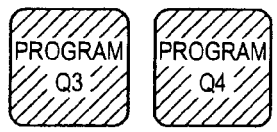
FIG. 10 is a diagram showing the higher layer configuring the display screen (on program object shift) according to the present embodiment.

FIGS. 10A to 10D show the higher layer, respectively. FIG. 10A shows the higher layer at the time in the state of FIG. 8A. In this figure, the program object "program Q2" is illustrated. FIG. 10B shows the higher layer at the time in the state of FIG. 8B. Also in this figure, the program object "program Q2" is illustrated. FIG. 10C shows the higher layer at the time in the state of FIG. 8C. In this figure, the program object "program Q2" is illustrated. The hatching of the program object "program Q2" in FIG. 10C is shown to be coarser than the hatching of other program objects, and the hatching is shown to be coarser as the transmittance of the program object "program Q2" is lowered. FIG. 10D shows the higher layer at the time in the state of FIG. 8D. In this figure, the program object "program Q2" is not illustrated.

In this manner, when the program object is shifted, the program object to be shifted is erased from the higher layer. In this case, as the transmittance of the program object to be shifted is lowered in a stepwise manner from the shift start until the shift completion so that the program object to be shifted is preferably faded out.

7. Layers Configuring Display Screen According to the Present Embodiment (on Cursor Movement)

Subsequently, the layers configuring the display screen according to the present embodiment (on cursor movement) will be described with reference to FIGS. 11 to 13 (see FIG. 1 as needed). FIG. 11 is a diagram showing a state where both the lower layer and the higher layer configuring the display screen according to the present embodiment (on cursor movement) are superimposed. FIG. 12 is a diagram showing the lower layer configuring the display screen according to the present embodiment (on cursor movement). FIG. 13 is a diagram showing the higher layer configuring the display screen according to the present embodiment (on cursor movement).

FIGS. 11A to 11D show a state where both the lower layer and the higher layer are superimposed, respectively. FIG. 11A shows a state where the cursor 150 is placed on the program object "program Q2". FIG. 11B shows a process state where the cursor 150 is moving from the program object "program Q2" to the program object "program Q1". FIG. 11C shows a process state where the cursor 150 is moving from the program object "program Q2" to the program object "program Q1". FIG. 11D shows a state where the movement of the cursor 150 is terminated and then the cursor 150 is placed on the program object "program Q1".

Figure 12A:
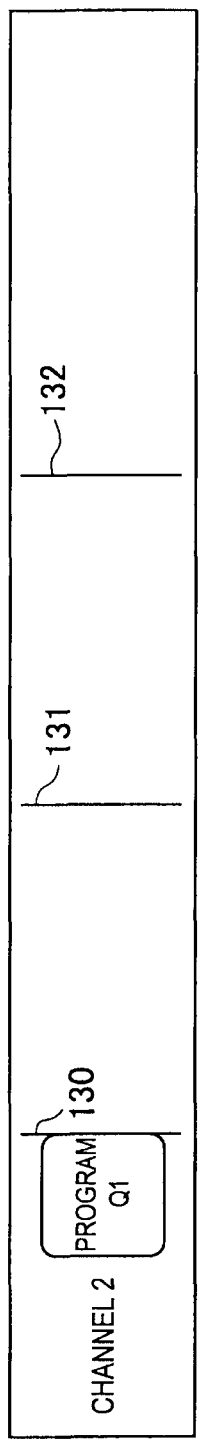
FIG. 12 is a diagram showing the lower layer configuring the display screen (on cursor movement) according to the present embodiment.
Figure 12B:
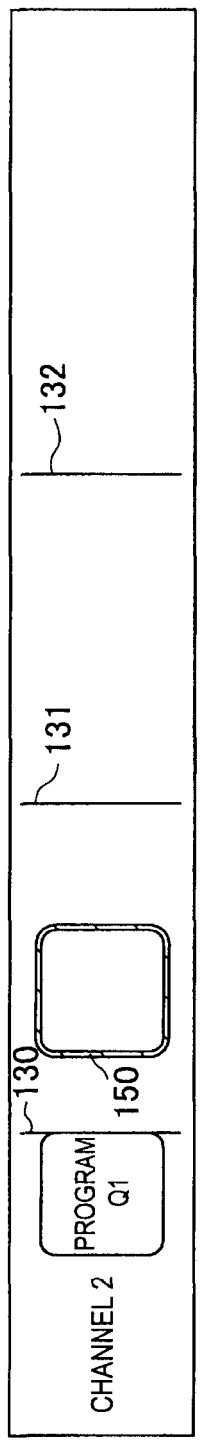
Figure 12C:
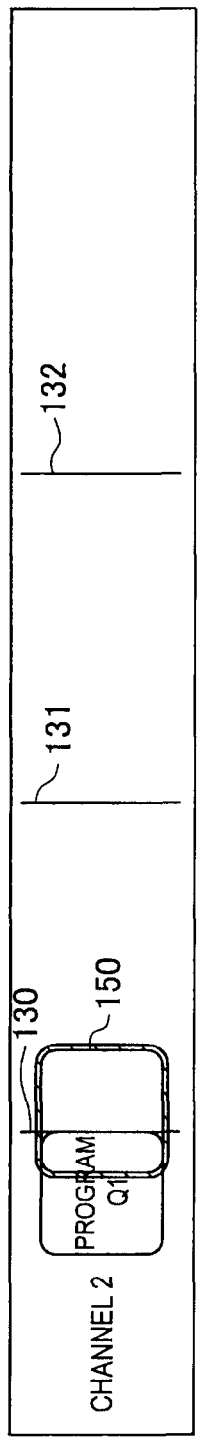
Figure 12D:
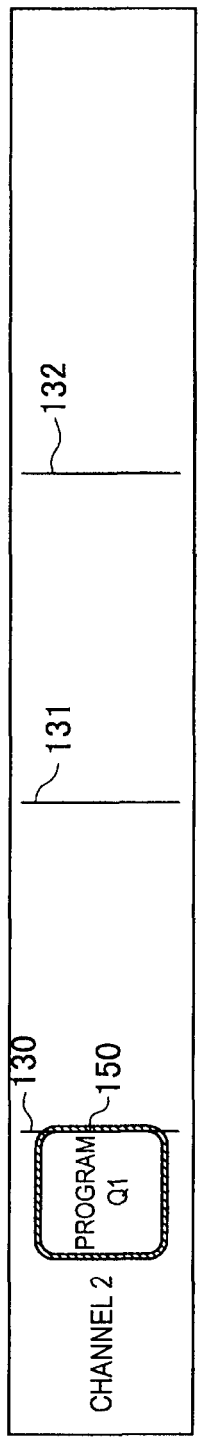

FIGS. 12A to 12D show the lower layer, respectively. FIG. 12A shows the lower layer at the time in the state of FIG. 11A. In this figure, the cursor 150 is not illustrated. FIG. 12B shows the lower layer at the time in the state of FIG. 11B. In this figure, the cursor 150 is illustrated. FIG. 12C shows the lower layer at the time in the state of FIG. 11C. In this figure, the cursor 150 is illustrated. The hatching of the cursor 150 in FIG. 12C is shown to be finer than the hatching of the cursor 150 in FIG. 12B, but is shown to be coarser as the transmittance of the cursor 150 is lowered. FIG. 12D shows the lower layer at the time in the state of FIG. 11D. Also in this figure, the cursor 150 is illustrated. The hatching of the cursor 150 in FIG. 12D is shown to be finer than the hatching of the cursor 150 in FIG. 12C.

In this manner, when the cursor 150 is moved, the cursor 150 is set in the lower layer. In this case, the transmittance of the cursor 150 is increased in a stepwise manner from the movement start of the cursor 150 until the movement termination so that the cursor 150 is preferably faded in.

Figure 13A:
FIG. 13 is a diagram showing the higher layer configuring the display screen (on cursor movement) according to the present embodiment.
Figure 13B:
Figure 13C:
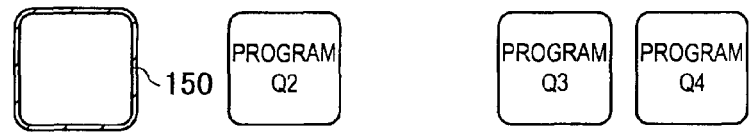
Figure 13D:

FIGS. 13A to 13D show the higher layer, respectively. FIG. 13A shows the higher layer at the time in the state of FIG. 11A. In this figure, the cursor 150 is illustrated. FIG. 13B shows the higher layer at the time in the state of FIG. 11B. In this figure, the cursor 150 is illustrated. The hatching of the cursor 150 in FIG. 13B is shown to be coarser than the hatching of the cursor 150 in FIG. 13A. FIG. 13C shows the higher layer at the time in the state of FIG. 11C. In this figure, the cursor 150 is illustrated. The hatching of the cursor 150 in FIG. 13C is shown to be coarser than the hatching of the cursor 150 in FIG. 13B. FIG. 13D shows the higher layer at the time in the state of FIG. 11D. Also in this figure, the cursor 150 is not illustrated.

In this manner, when the cursor 150 is moved, the cursor 150 is erased from the higher layer. In this case, the transmittance of the cursor 150 is lowered in a stepwise manner from the movement start of the cursor 150 until the movement termination so that the cursor 150 is preferably faded out.

Figure 14:
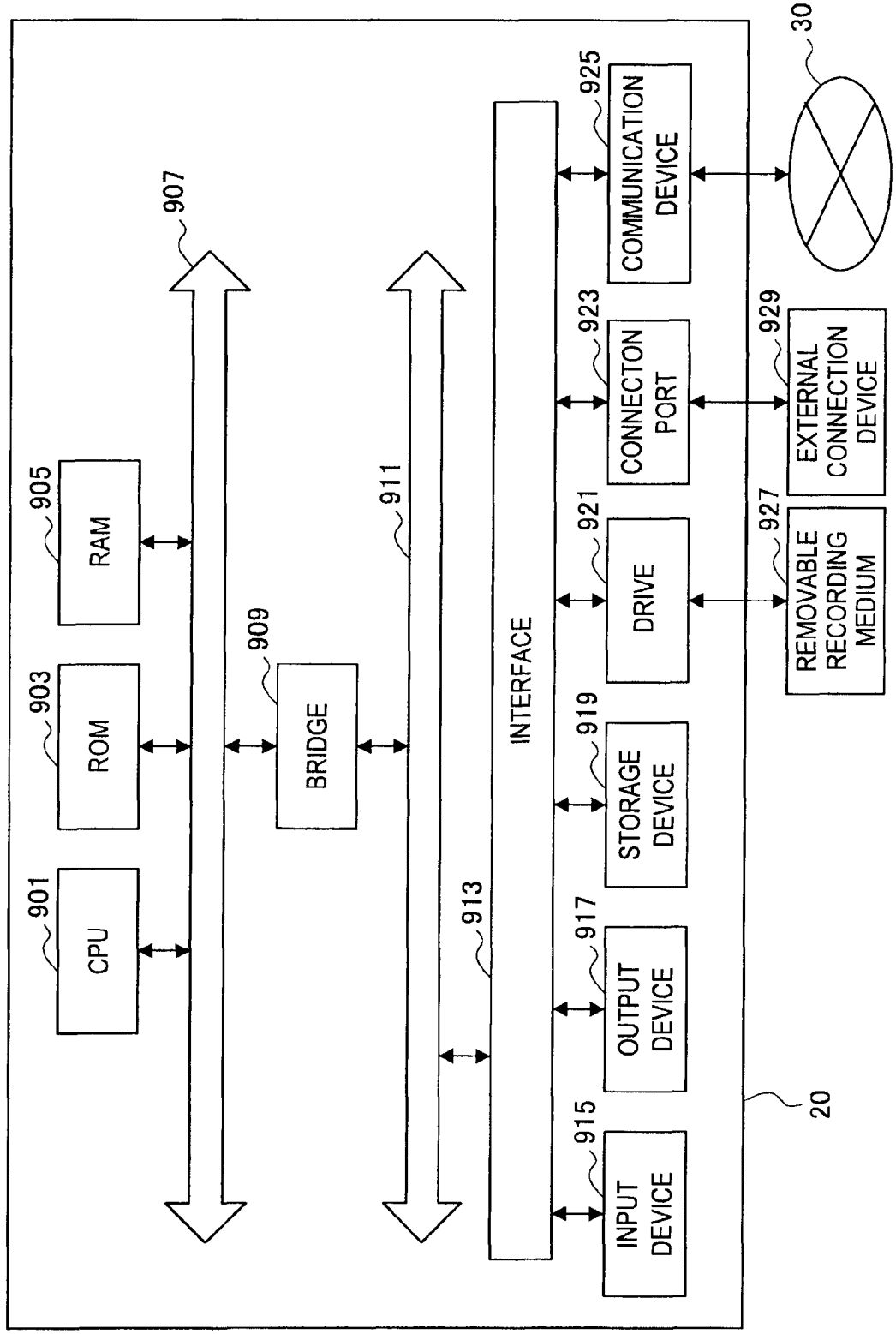
FIG. 14 is a block diagram for explaining a hardware configuration of a client device 20 according to the present embodiment.

8. Hardware Configuration of Client Device According to the Present Embodiment Next, a hardware configuration of the client device 20 according to the present embodiment will be described in detail with reference to FIG. 14. FIG. 14 is a block diagram for explaining the hardware configuration of the client device 20 according to the present embodiment.

The client device 20 mainly includes a CPU 901, a ROM 903, a RAM 905, a host bus 907, a bridge 909, an external bus 911, an interface 913, an input device 915, an output device 917, a storage device 919, a drive 921, a connection port 923 and a communication device 925.

The CPU 901 functions as a calculation processing device and a control device, and controls all or part of the operations inside the client device 20 according to various programs recorded in the ROM 903, the RAM 905, the storage device 919 or a removable recording medium 927. The ROM 903 stores therein programs, calculation parameters and the like used by the CPU 901. The RAM 905 temporarily stores therein programs used for execution of the CPU 901, parameters appropriately changing in the execution thereof, and the like. These are interconnected via the host bus 907 configured with an internal bus such as CPU bus.

The host bus 907 is connected to the external bus 911 such as PCI (Peripheral Component Interconnect/Interface) bus via the bridge 909.

The input device 915 is a user-operating operation means such as mouse, keyboard, touch panel, buttons, switch and lever. Further, the input device 915 may be a remote control means (that is, remote controller) using infrared ray or other radio wave, or may be an external connection device 929 such as cell phone or PDA corresponding to the operation of the client device 20. Furthermore, the input device 915 generates an input signal based on the user-input information by using the above operation means, and is configured with an input control circuit for outputting to the CPU 901. The user of the client device 20 can input various items of data in the client device 20 or instruct the processing operation thereto by operating the input device 915.

The output device 917 is configured with a device capable of visually or aurally notifying the user of the obtained information, such as display device including CRT display device, liquid crystal display device, plasma display device, EL display device and lamp, audio output device including speaker and headphone, printer device, cell phone or facsimile. The output device 917 outputs a result obtained through various processings performed by the client device 20, for example. Specifically, the display device displays the result obtained through various processings performed by the client device 20 in text or image. On the other hand, the audio output device converts an audio signal made of reproduced audio data, acoustic data or the like into an analog signal for outputting.

The storage device 919 is a data storage device configured as one example of the storage unit of the client device 20, and is configured with a magnetic storage device such as HDD (Hard Disk Drive), a semiconductor storage device, an optical storage device, a magnetooptical storage device or the like, for example. The storage device 91 stores therein the programs performed by the CPU 901 or various items of data, acoustic signal data or image signal data obtained from the outside, and the like.

The drive 921 is a reader/writer for recording medium, and is incorporated in or externally attached to the client device 20. The drive 921 reads out the information recorded in the removable recording medium 927 such as mounted magnetic disk, optical disk, magnetooptical disk or semiconductor memory and outputs the same to the RAM 905. The drive 921 can write records in the removable recording medium 927 such as mounted magnetic disk, optical disk, magnetooptical disk or semiconductor memory. The removable recording medium 927 includes DVD media, HD-DVD media, Blu-ray media, compact flash (CF) (registered trademark), memory stick, SD memory card (Secure Digital memory card) or the like, for example. Further, the removable recording medium 927 may be an IC card (Integrated Circuit card) mounting thereon non-contact IC chip, electronic device or the like, for example.

The connection port 923 is directed for directly connecting a device such as USB (Universal Serial Bus) port, IEEE1394 port such as i.Link, SCSI (Small Computer System Interface) port, RS-232C port, optical audio terminal, HDMI (High-Definition Multimedia Interface) port to the client device 20. The external connection device 929 is connected to the connection port 923 so that the client device 20 directly obtains acoustic signal data or image signal data from the external connection device 929 or provides acoustic signal data or image signal data to the external connection device 929.

The communication device 925 is a communication interface configured with a communication device or the like for connecting to the network 30, for example. The communication device 925 is a communication card for wired or wireless LAN (Local Area Network), Bluetooth or WUSB (Wireless USB), a router for optical communication, a router for ADSL (Asymmetric Digital Subscriber Line), a modem for various communications, or the like, for example. The communication device 925 can exchange acoustic signal and the like with Internet or other communication device, for example. The network 30 connected to the communication device 925 may be configured with a network connected in a wired or wireless manner, and may be Internet, home LAN, infrared communication, radio wave communication, satellite communication or the like, for example.

There has been described one example of the hardware configuration capable of realizing the functions of the client device 20 according to each embodiment of the present invention. Each component described above may be configured with a general member or may be configured in hardware specific to the function of each component. Thus, the hardware configuration to be utilized can be appropriately changed depending on a technical level when the present embodiment is performed.

Variants of the Present Embodiment

It should be understood by those skilled in the art that various modifications, combinations, sub-combinations and alterations may occur depending on design requirements and other factors insofar as they are within the scope of the appended claims or the equivalents thereof.

For example, in the present embodiment, though the techniques of a client device for displaying a program information included in an EPG data have been described, the techniques described in the present embodiment is not limited to the EPG data and can be applied when displaying various schedule information.

The present application contains subject matter related to that disclosed in Japanese Priority Patent Application JP 2008-226343 filed in the Japan Patent Office on Sep. 3, 2008, the entire contents of which is hereby incorporated by reference.

What is claimed is:
1. A display control apparatus comprising:
an EPG data obtaining unit for obtaining EPG data from an EPG data providing server for providing the EPG data containing one or several items of program information;
a display unit for displaying a display screen; and
a display control unit for setting a static current time line indicating a current time on the display screen to divide the display screen into a fixed region and a moving region across the current time line as boundary and setting at least one static delay time line within the moving region indicating a delay relative to the current time, for moving a program object set in the moving region toward the current time line and away from the at least one delay time line at a predetermined speed to set, among program information contained in the EPG data obtained by the EPG data obtaining unit, a program object describing therein program identification infor- mation whose program start time is later than a current time, which is contained in the program information, at a position reaching the current time line in the moving region when the program start time comes, and for, when the program object reaches the current time line, shifting the program object to the fixed region.

2. The display control apparatus according to claim 1, wherein the display control unit sets the sizes of the program objects of all program information contained in the EPG data to be the same.

3. The display control apparatus according to claim 1, wherein when the program object is shifted to the fixed region, the display control unit fades a program object reaching the current time line out the moving region and fades the program object in the fixed region.

4. A display control method comprising the steps of:
obtaining EPG data from an EPG data providing server for providing the EPG data containing one or several items of program information by an EPG data obtaining unit of a display control apparatus including an EPG data obtaining unit, a display unit for displaying a display screen and a display control unit; setting a current time line indicating a current time on a display screen to divide the display screen into a fixed region and a moving region across the current time line as boundary and setting at least one static delay time line within the moving region indicating a delay relative to the current time, and moving a program object set in the moving region toward the current time line and away from the at least one delay time line at a predetermined speed by the display control unit;
setting, among program information contained in the EPG data obtained by the EPG data obtaining unit, a program object describing therein program identification information whose program start time is later than a current time, which is contained in the program information, at a position reaching the current time line in the moving region when the program start time comes; and when the program object reaches the current time line, shifting the program object to the fixed region.

5. A communication system comprising:
an EPG data providing server for providing EPG data containing one or several items of program information; and
a display control apparatus including
an EPG data obtaining unit for obtaining the EPG data from the EPG data providing server;
a display unit for displaying a display screen; and a display control unit for setting a static current time line indicating a current time on the display screen to divide the display screen into a fixed region and a moving region across the current time line as boundary and setting at least one static delay time line within the moving region indicating a delay relative to the current time, for moving a program object set in the moving region toward the current time line and away from the at least one delay time line at a predetermined speed, for setting, among program information contained in the EPG data obtained by the EPG data obtaining unit, a program object describing therein program identification information whose program start time is later than a current time, which is contained in the program information, at a position reaching the current time line in the moving region when the program start time comes, and for, when the program object reaches the current time line, shifting the program object to the fixed region.

* * * * *